United States Patent
Abraham et al.

(12) 
(10) Patent No.: US 6,239,936 B1
(45) Date of Patent: May 29, 2001

(54) METHOD AND APPARATUS FOR CALIBRATING A THERMAL RESPONSE OF A MAGNETORESISTIVE ELEMENT

(75) Inventors: David William Abraham, Ossining; Timothy Joseph Chainer, Mahopac; Karl-Friedrich Etzold, Briarcliff Manor, all of NY (US); Hal Hjalmar Ottesen; Gordon James Smith, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/914,662

(22) Filed: Aug. 19, 1997

(51) Int. Cl.[7] .................................................. G11B 21/02
(52) U.S. Cl. ............................................... 360/75; 360/25
(58) Field of Search ................................. 360/25, 77.03, 360/75, 78.11

(56) References Cited

U.S. PATENT DOCUMENTS

| | | |
|---|---|---|
| 3,416,373 | 12/1968 | Havens . |
| 3,686,682 * | 8/1972 | Behr et al. .............................. 360/25 |
| 3,918,091 | 11/1975 | Walraven et al. . |
| 4,430,010 | 2/1984 | Zrenner et al. . |
| 4,485,337 | 11/1984 | Sandusky . |
| 4,498,146 | 2/1985 | Martinez . |
| 4,532,802 | 8/1985 | Yeack-Scranton et al. . |
| 4,647,992 | 3/1987 | Vinal . |
| 4,669,011 | 5/1987 | Lemke . |
| 4,691,259 | 9/1987 | Imakoshi et al. . |
| 4,712,144 | 12/1987 | Klaassen . |
| 4,747,698 | 5/1988 | Wickramsinghe et al. . |
| 4,762,427 | 8/1988 | Hori et al. . |
| 4,777,544 | 10/1988 | Brown et al. . |
| 4,802,033 | 1/1989 | Chi . |
| 4,853,810 | 8/1989 | Pohl et al. . |
| 4,914,398 | 4/1990 | Jove et al. . |
| 4,931,887 | 6/1990 | Hedge et al. . |
| 4,949,036 | 8/1990 | Bezinque et al. . |
| 5,032,935 | 7/1991 | Jove et al. . |
| 5,054,936 | 10/1991 | Fraden . |
| 5,057,785 | 10/1991 | Chung et al. . |
| 5,070,495 | 12/1991 | Bletscher, Jr. et al. . |

(List continued on next page.)

FOREIGN PATENT DOCUMENTS

| | | |
|---|---|---|
| 0 242 597 | 10/1987 | (EP) . |
| 61-177622 | 8/1986 | (JP) . |
| 63-191316 | 8/1988 | (JP) . |
| 1-18980 | 4/1989 | (JP) . |
| 4-95218 | 3/1992 | (JP) . |
| 4-109421 | 4/1992 | (JP) . |
| 4-141822 | 5/1992 | (JP) . |
| 5-174515 | 7/1993 | (JP) . |
| 06290563 | 10/1994 | (JP) . |

OTHER PUBLICATIONS

L. R. Bellamy et al., "Disk Drive Motor Speed Control," *IBM Technical Disclosure Bulletin*, 23(11) 5163 (1981).

S. Z. Dushkes et al., "Head Crash Detector," *IBM Technical Disclosure Bulletin*, 13 (12) 3685 (1971).

(List continued on next page.)

*Primary Examiner*—David Hudspeth
*Assistant Examiner*—K. Wong
(74) *Attorney, Agent, or Firm*—Merchant & Gould, P.A.; Mark A. Hollingsworth

(57) ABSTRACT

A method and apparatus for calibrating a thermal response of a magnetoresistive element is provided. In accordance with one embodiment of the invention, a thermal spacing signal is read using an MR element spaced apart from a surface of a moving storage medium. From the thermal spacing signal a signal value and calibration value are produced. Using the signal value and the calibration value a calibrated signal value is produced. The calibrated signal value may, for example, be compared against a predetermined threshold to detect surface defects on the storage medium.

32 Claims, 9 Drawing Sheets

U.S. PATENT DOCUMENTS

| | | |
|---|---|---|
| 5,079,663 | 1/1992 | Ju et al. . |
| 5,084,791 | 1/1992 | Thanos et al. . |
| 5,130,866 | 7/1992 | Klaassen et al. . |
| 5,168,413 | 12/1992 | Coker et al. . |
| 5,185,681 | 2/1993 | Volz et al. . |
| 5,212,677 | 5/1993 | Shimote et al. . |
| 5,233,482 | 8/1993 | Galbraith et al. . |
| 5,258,940 | 11/1993 | Coker et al. . |
| 5,301,080 | 4/1994 | Ottesen et al. . |
| 5,321,559 | 6/1994 | Nguyen et al. . |
| 5,327,298 | 7/1994 | Ottesen et al. . |
| 5,345,342 | 9/1994 | Abbott et al. . |
| 5,367,409 | 11/1994 | Ottesen et al. . |
| 5,377,058 | 12/1994 | Good et al. . |
| 5,388,014 | 2/1995 | Brug et al. . |
| 5,402,278 | 3/1995 | Morita . |
| 5,418,770 | 5/1995 | Ide et al. . |
| 5,424,885 | 6/1995 | McKenzie et al. . |
| 5,430,706 | 7/1995 | Utsunomiya et al. . |
| 5,455,730 | 10/1995 | Dovek et al. . |
| 5,739,972 | 4/1998 | Smith et al. . |
| 5,751,510 * | 5/1998 | Smith et al. .................. 360/77.03 X |
| 5,838,514 * | 11/1998 | Smith et al. .................. 360/77.03 X |

OTHER PUBLICATIONS

R. E. Fontana et al., "Disk Asperity Detector," *IBM Technical Disclosure Bulletin,* 26(3A) 1278–1280 (1983).

F. W. Gorter et al., "Magnetoresistive Reading of Information," *IEEE Transactions on Magnetics, MAG–10* (3) 899–902 (1974).

E. G. Gruss et al., "Servo System for Magnetic Recording Based On Time Comparison," *IBM Technical Disclosure Bulletin, 23* (2) 787–789 (1980).

G. J. Kerwin et al., "Fast Offset Recovery for Thermal Asperity Data Recovery Procedure," *IBM Technical Disclosure Bulletin, 34* (11) 217–219 (1992).

K. B. Klaassen, "Magnetic Recording Channel Front–Ends," IBM Research Report, pp. 1–6, Nov. 1, 1991.

J. S. Lim, *Two–Dimensional Signal and Image Processing,* Prentice–Hall, Inc., Englewood Cliffs, New Jersey, pp. 527–540 (1990).

J. S. Lim, *Two–Dimensional Signal and Image Processing,* Prentice–Hall, Inc., Engelwood Cliffs, New Jersey, pp. 527–540 (1990).

C. Lin, "Techniques for the Measurement of Air–Bearing Separation– A Review," *IEEE Transactions on Magnetics, MAG–9* (4) 673–677 (1973).

F. E. Talke et al., "Surface Defect Studies of Flexible Media Using Magnetoresisitive Sensors," *IEEE Transactions on Magnetics, MAG–11*(5) 1188–1190 (1975).

S. Tanaka et al., "Characterization of Magnetizing Process for Pre–Embossed Servo Pattern of Plastic Hard Disks," *IEEE Transaction on Magnetics, 30*(6) 4209–4211 (1994).

H. Yada et al., "High Areal Density Recording Using an MR/Inductive Head and Pre–Embossed Rigid Magnetic Disk," *IEEE Transactions on Magnetics, 30*(2) 404–409 (1994).

Research Disclosure, "Asperity Knee Detection Using Harmonic Ratio Flyheight," Emsworth Design, Inc., No. 323, p. 190 (Mar. 1991).

* cited by examiner

METHOD AND APPARATUS FOR CALIBRATING A THERMAL RESPONSE OF A MAGNETORESISTIVE ELEMENT

RELATED APPLICATIONS

This application is related to co-pending U.S. application Ser. Nos. 08/581,877; 08/581,906; 08/581,981; 08/582,555 each of which were filed on Jan. 2, 1996 and co-pending U.S. application Ser. No. 08/697,217 filed on Aug. 21, 1996, all of which are assigned to the assignee of the instant application, and the contents of which are incorporated herein by reference.

FIELD OF THE INVENTION

The present invention relates generally to information storage systems and, more particularly, to a method and apparatus for calibrating a thermal response of a magnetoresistive (MR) element employed in an information storage system.

BACKGROUND OF THE INVENTION

A typical data storage system includes a magnetic medium for storing data in magnetic form and a transducer used to write and read magnetic data respectively to and from the medium. A disk storage device, for example, includes one or more data storage disks coaxially mounted on a hub of a spindle motor. The spindle motor rotates the disks at speeds typically on the order of several thousand revolutions-per-minute. Digital information is typically-stored in the form of magnetic transitions on a series of concentric, spaced tracks comprising the surface of the magnetizable rigid data storage disks. The tracks are generally divided into a plurality of sectors, with each sector comprising a number of information fields, including fields for storing data, and sector identification and synchronization information, for example.

The actuator assembly typically includes a plurality of outwardly extending arms with one or more transducers and slider bodies being mounted on flexible suspensions. A slider body is typically designed as an aerodynamic lifting body that lifts the transducer head off of the surface of the disk as the rate of spindle motor rotation increases, and causes the head to hover above the disk on an air-bearing produced by high speed disk rotation. The distance between the head and the disk surface, typically on the order of 50–100 nanometers (nm), is commonly referred to as head-to-disk spacing.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical signals, commonly referred to as read back signals, in the read element.

Conventional data storage systems generally employ a closed-loop servo control system for positioning the read/write (R/W) transducers to specified storage locations on the data storage disk. During normal data storage system operation, a servo transducer, generally mounted proximate the read/write transducers, or, alternatively, incorporated as the read element of the transducer, is typically employed to read information for the purpose of following a specified track (track following) and locating (seeking) specified track and data sector locations on the disk.

Within the data storage system manufacturing industry, much attention is presently being focused on the use of an MR element as a read transducer. Although the MR element would appear to provide a number of advantages over conventional thin-film heads and the like, it is known by those skilled in the art that the advantages offered by the MR element are not fully realizable due to the present inability of data storage systems to accommodate a number of undesirable MR element characteristics.

In particular, MR element transducers introduce a distortion in the sensed magnetic signal, which typically represents data or servo information stored on a magnetic storage disk. The distortion to the magnetic signal is caused by many factors, including a number of undesirable characteristics inherent in the MR element and the specific configuration and orientation of the MR element when incorporated into a transducer assembly. Notwithstanding such undesirable characteristics, the data storage system manufacturing community continues to expend resources to develop improved MR element transducers.

Several techniques have been developed to convert the magnetic signal induced in an MR element transducer to a spacing signal that varies as a function of head-to-disk spacing changes. For example, the magnetic spacing signal has been used in defect screening procedures in an effort to detect the presence of anomalous disk surface features. Such surface defects are typically associated with excessively large head-to-disk spacing changes or disk surface contact events.

In order to conduct a survey of a disk surface using such a conventional approach, magnetic information must first be written to the disk surface from which the magnetic spacing signal is subsequently produced. It is appreciated by those skilled in the art that writing magnetic information to a disk surface for purposes of conducting defect screening is a time consuming and costly process. By way of example, a conventional high capacity data storage system may include ten data storage disks, each of which has two data storing surfaces. Associated with each of the twenty data storing disk surfaces is an R/W transducer. Although twenty write elements may be used to write magnetic information to the twenty disk surfaces, such a conventional data storage system includes only a single write channel which must be multiplexed, or time-shared, across the twenty transducers. As such, the magnetic information is written to each of the twenty disk surfaces one surface at a time.

Assuming that each of the twenty data storing surfaces is formatted to include 6,000 tracks per inch (TPI), and the disks are rotated at a rate of 7,200 revolutions per minute (RPM), and further assuming typical delays associated with actuator and MR transducer positioning, it will take approximately one minute to write the magnetic information to each of the twenty data storing surfaces, or approximately twenty minutes to process all of the-twenty disk surfaces. Only after the magnetic information is written to the twenty disk surfaces can a conventional disk surface surveying procedure be performed.

Further, it is known that a magnetic spacing signal incorrectly indicates the presence of certain surface features, such as magnetic voids, as variations in the topography of a disk surface. Moreover, contact between the MR element and the disk surface can result in wearing of the magnetic film provided on the disk surface, thereby producing a magnetic void at the abraded disk surface location.

There exists a keenly felt need in the data storage system manufacturing community for an apparatus and method for reducing the cost and time currently expended when conducting a survey of a disk surface using an MR element transducer. There exists a further need to provide such an apparatus and method which is not compromised by the undesirable characteristics inherent in an MR element transducer. The present invention is directed to these and other needs.

SUMMARY OF THE INVENTION

The present invention generally provides a method and apparatus for calibrating a thermal response of an magnetoresistive (MR) element. The disclosed calibration technique may, for example, be used for the detection of surface defects on a storage medium.

In accordance with one embodiment of the invention, a thermal spacing signal is read using an MR element spaced apart from a surface of a moving storage medium. From the thermal spacing signal, a signal value and calibration value are produced. Using the signal value and the calibration value, a calibrated signal value is produced. The calibration value may, for example, be indicative of the surface roughness of a portion of the storage medium over which the MR element traverses and the signal value may, for example, be indicative of the largest bump on the surface of the portion of the storage medium. The calibrated signal value may, for example, be compared against a pre-determined threshold to detect surface defects on the storage medium.

In accordance with one aspect of the invention, the thermal spacing signal is a signal induced in the MR element as the MR element traverses a track of the storage medium. The thermal spacing signal may, for example, be a time-averaged thermal spacing signal generated by sampling a thermal signal of the MR element as the MR element is positioned over a moving storage medium and the storage medium is moved through a number of revolutions.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
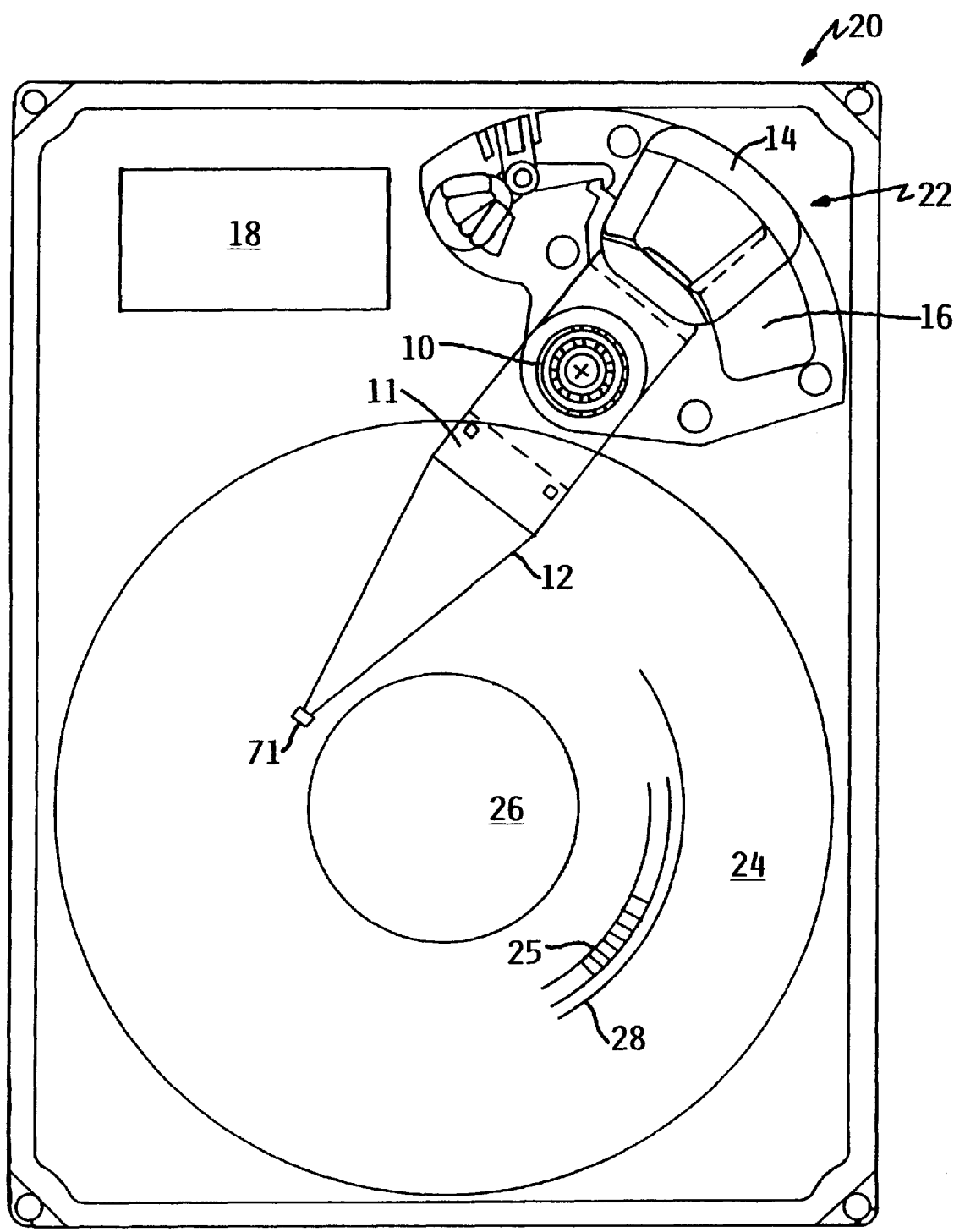
FIG. 1 is a top view of a data storage system with its upper housing cover removed.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE EMBODIMENTS

The present invention is an apparatus and method for calibrating a thermal response of an MR element. The present invention may be advantageously employed to survey the surface topography of a data storage disk and to accurately and reliably detect disk surface features and defects. A calibration methodology is employed to calibrate the thermal response of the MR element transducer so as to produce a calibrated thermal spacing signal which may be used to perform storage medium surface surveying and defect detection. While the invention is particularly suited for use with data storage disks, the invention is not so limited. Other types of storage mediums and their associated systems, such as tape drives, which employ MR read elements are intended to be covered by the invention.

In accordance with an embodiment, the present invention obviates the traditional approach of using a magnetic signal induced in the MR element to analyze a disk surface. The time consuming and expensive process of initially writing magnetic information to the entire disk surface prior to performing a conventional glide test is thus eliminated. Further, the present invention provides for increased accuracy when performing disk surface feature detection and head-to-disk spacing determinations as contrasted to conventional approaches that utilize magnetic information written to the disk surface.

An important advantage of the present invention concerns the ability to detect head-to-disk spacing changes in-situ, or within the housing of the data storage system, using the thermal response of the MR element. In-situ head-to-disk spacing measurements using the thermal response of the MR element is useful for purposes of disk manufacturing testing and screening, and for performing predictive failure analysis (PFA) during the service life of the data storage system in the field. The thermal spacing signal can further be used to detect head contact with the surface of a data storage disk.

The magnitude of the thermal signal induced in an MR element is generally a function of head-to-disk spacing and the thermal sensitivity of the particular MR element used in the transducer assembly. The thermal sensitivity of an MR element can however change over time. Thermal sensitivity changes can, for example, result from variations in ambient temperature, head resistance, head bias current, and other electronic parameters. These changes in thermal sensitivity make the use of an absolute thermal signal subject to variations. Variations in the manufacturing process and materials used for an MR element can also cause variations in the response of an MR element. Thus, in order to accurately determine head-to-disk spacing change using the thermal response of an MR element, it is desirable to calibrate the thermal response in-situ. The present invention provides a methodology for such calibration.

Referring now to the drawings and, more particularly, to FIG. 1, there is illustrated an exemplary data storage system employing R/W transducers 71 having MR read elements. The data storage system 20 typically includes one or more rigid data storage disks 24 which rotate about a spindle motor 26. An actuator assembly 10 typically includes a plurality of interleaved actuator arms 11 and suspensions 12, with each suspension supporting one or more R/W transducers 71 (each employing an MR read element) for reading and writing information respectively to and from the data storage disks 24.

The actuator assembly 10 includes a coil assembly 14 which cooperates with a permanent magnet assembly 16 to operate as an actuator voice coil motor 22 responsive to control signals produced by a controller 18, which typically includes, or is coupled to, a microprocessor. The controller 18 coordinates the transfer of data to and from the data storage disks 24, and cooperates with the actuator voice coil motor 22 to move the actuator arms/suspensions 11/12 and R/W transducers 71 to prescribed track 28 and sector 25 locations when reading and writing data to and from the disks 24. It should be appreciated that the above-described data storage system is provided by way of example not of limitation. As noted above, other information storage systems employing one or more MR elements to read information from a storage medium are intended to be covered by the invention.

Figure 2:
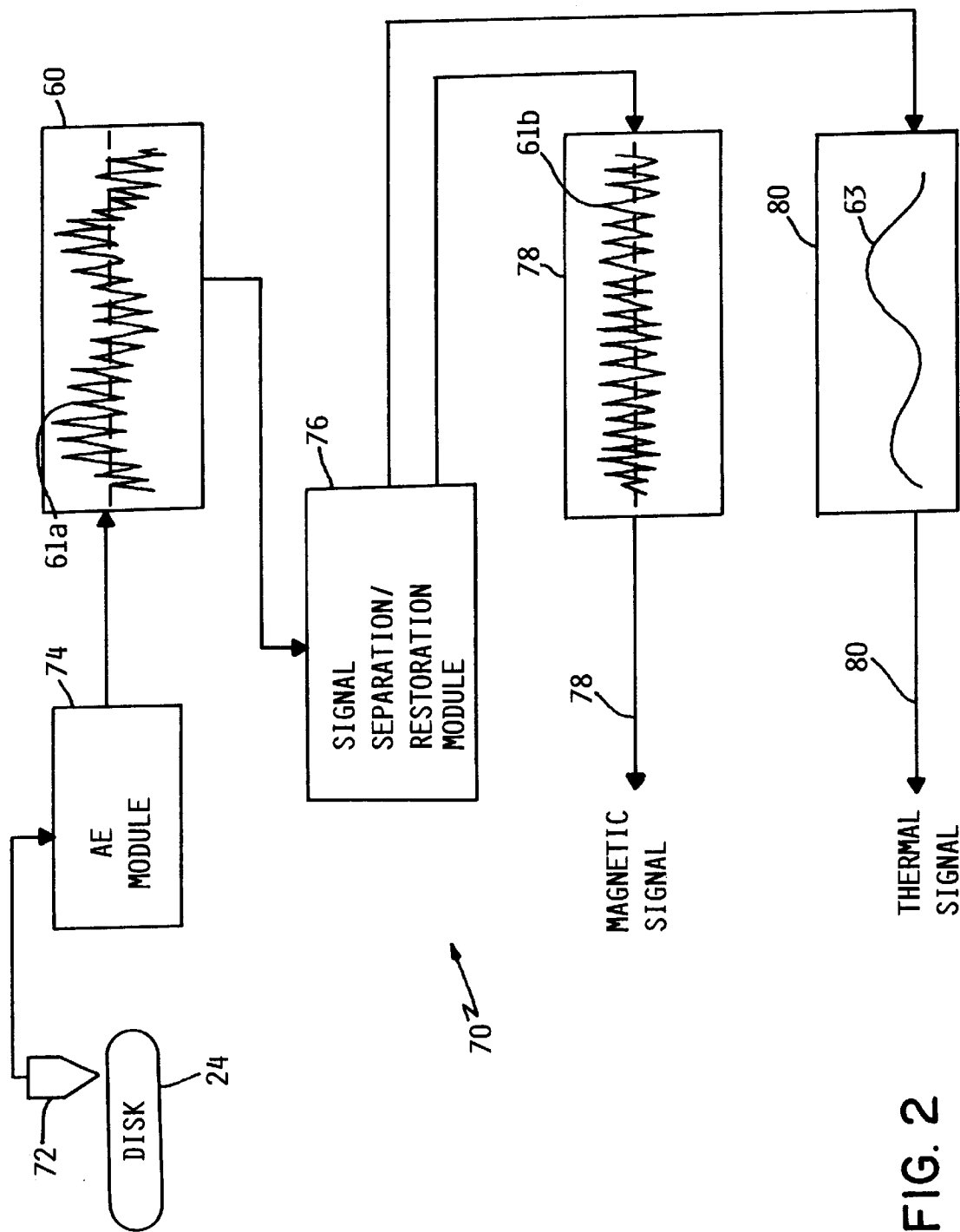
FIG. 2 is a block diagram of an apparatus for extracting a thermal signal and a magnetic signal from a read back signal induced in an MR element.

In FIG. 2, there is shown an apparatus 70 for reading an information signal having a magnetic signal component and a thermal signal component from a magnetic storage medium and for separating the thermal and magnetic signal components from the information signal. The information signal is processed to extract the thermal signal component from the information signal, and to remove the influence of the thermal signal component from the magnetic signal. The two independent magnetic and thermal signals extracted from the information signal may then be utilized individually or in combination to enhance the operation, performance, and reliability of the data storage system.

In particular, and as discussed hereinbelow, a thermal spacing signal, which is developed from the thermal signal component of the MR element and is proportional to the head-to-disk spacing, may be produced and calibrated to accurately and reliably determine spacing changes between the MR element and a surface of the disk 24. In one particular embodiment, discussed in greater detail below, a value indicative of the surface roughness of the storage medium is used to calibrate the thermal spacing signal.

In FIG. 2, an MR element 72 is shown in close proximity with a surface of a data storage disk 24. The information read by the MR element 72 from the disk 24 is generally referred to herein as a read back signal. The read back signal produced in the MR element 72 is typically amplified by the arm electronics (AE) module 74. Filtering of the read back signal by the AE module 74 may also be performed. As shown in graphical form at the output of the AE module 74, the analog read back signal 60, containing a relatively high frequency magnetic signal component 61a, exhibits a distorted D.C. baseline due to the presence of a low frequency modulating signal component. It is appreciated by those skilled in the art that a modulated read back signal 60, or more particularly, a modulated magnetic signal component 61a of the read back signal 60, has long been identified as one source of a number of data storage system maladies, including servo control errors and inaccuracies, causing a reduction in data storing and retrieving reliability, and, in some cases, an irretrievable loss of data.

As is discussed in detail in the related co-pending applications identified hereinabove, it has been discovered by the inventors that the read back signal 60 is a composite signal comprising independent magnetic and thermal signal components, and that the low frequency modulation in the read back signal is, in actuality, an independent thermal information signal component of the read back signal 60. Importantly, the up-to-now bothersome thermal signal component of a read back signal, referred to generally herein as the thermal signal, also includes an informational content which may be extracted from the read back signal 60 and utilized for a variety of advantageous purposes heretofore unappreciated by those skilled in the art, including, for example, determining any change in the flyheight of the MR element 72 with respect to a disk surface 24 to an accuracy on the order of 1 nanometer, and can be utilized for a number of other purposes, including disk surface analysis and topographical mapping, glide testing including disk defect detection and screening, error correction, and predictive failure analysis (PFA), for example.

Figure 3:
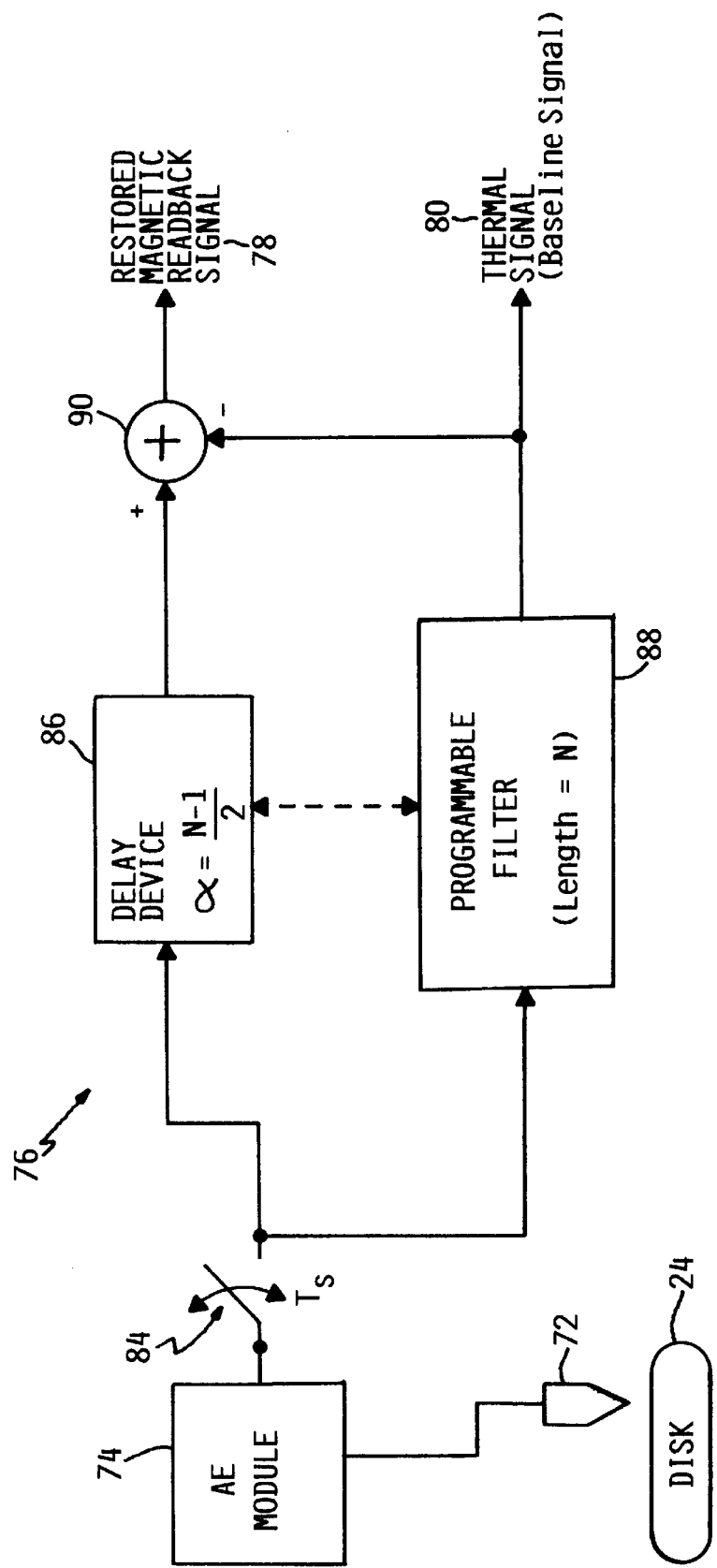
FIG. 3 is a block diagram of a signal separation/restoration module for extracting a thermal signal and a magnetic signal from a read back signal induced in an MR element.
Figure 4:
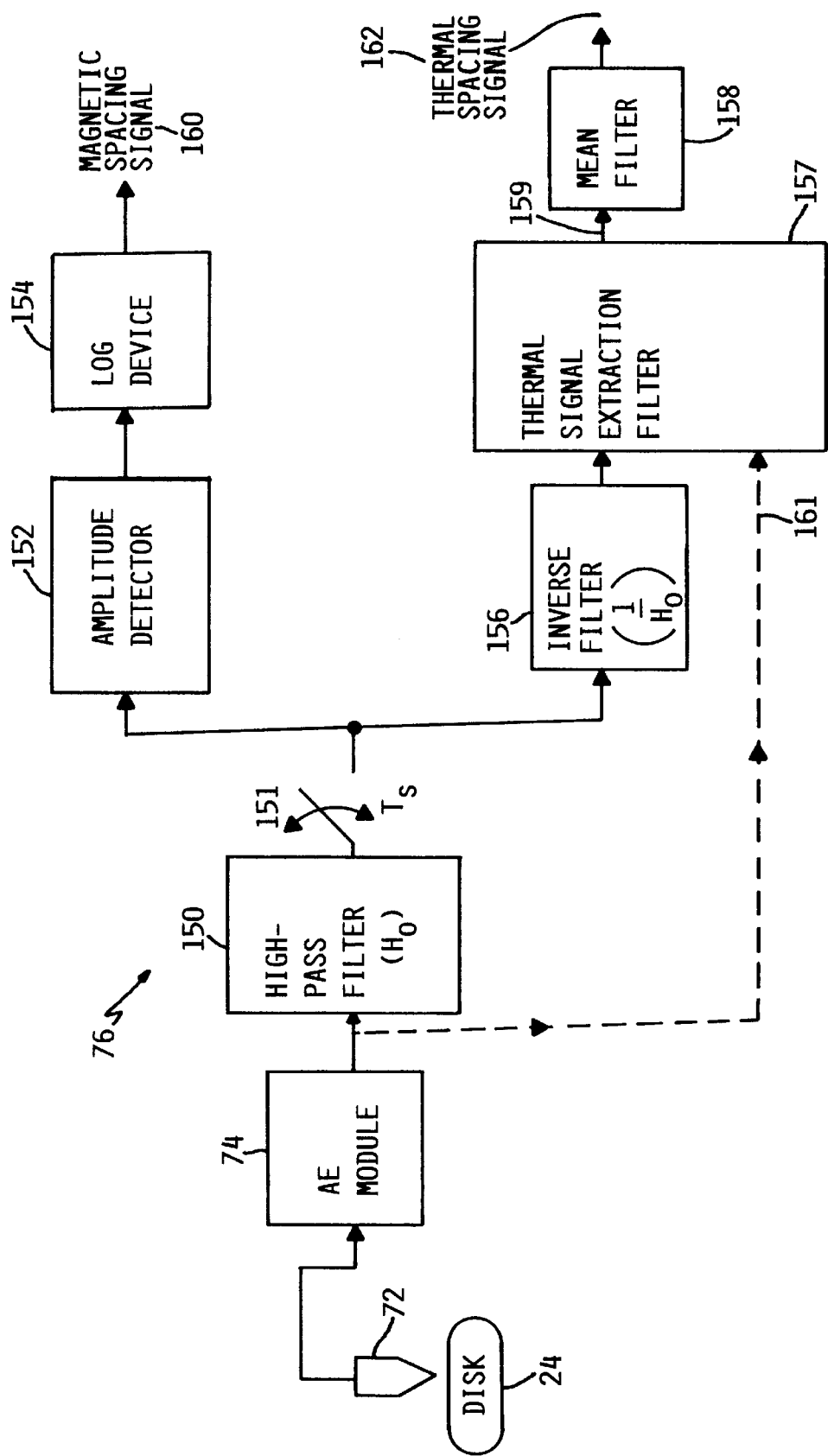
FIG. 4 is a block diagram of another embodiment of a signal separation/restoration module.

Referring to FIGS. 3 and 4, there is illustrated two embodiments of a signal separation/restoration module 76 discussed previously with respect to FIG. 2. The signal separation/restoration module 76 is employed to perform the dual tasks of separating the magnetic signal component from the read back signal 60 to remove low frequency thermal signal component, and, in addition, extracting the thermal signal from the read back signal, thus making available for subsequent processing the informational content of both the magnetic signal and thermal signal in substantially independent form. The two embodiments shown in FIGS. 3 and 4 are described in detail in the related co-pending applications identified hereinabove.

Figure 5:
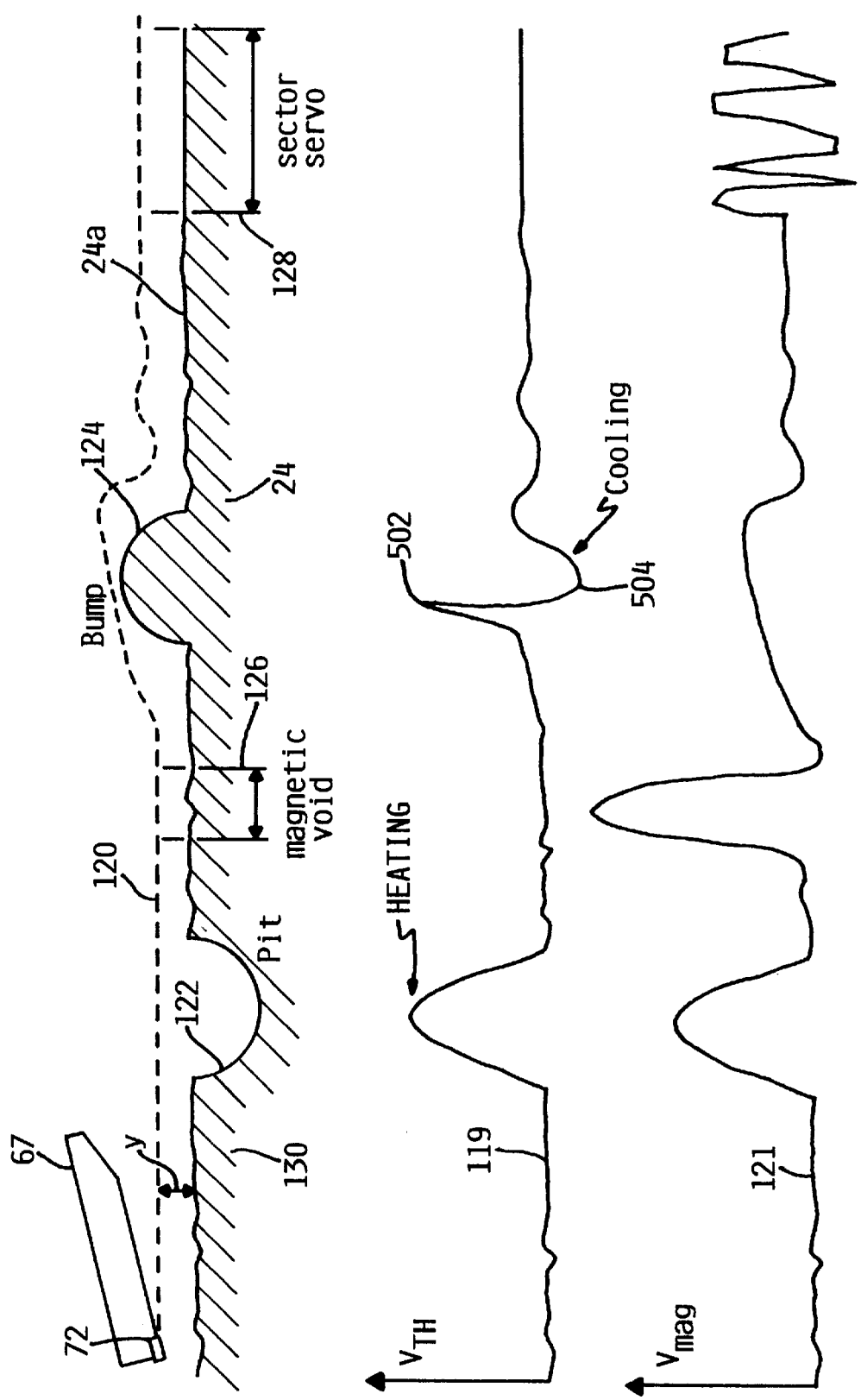
FIG. 5 is an exaggerated side view showing a data storage disk exhibiting various surface features, and a thermal response and magnetic spacing response of an MR element to such defects and features.

Viewing the read back signal in terms of its two independent and separable components reveals a previously unappreciated informational content available in a read back signal obtained using an MR element. In particular, information about the surface of the disk can be derived from the thermal signal. An exaggerated side view of an MR slider 67 and MR element 72 in proximity with the surface 24a of a magnetic data storage disk 24 is illustrated in FIG. 5. The disk surface 24a has a generally varying topography at a microscopic level. As is illustrated, a disk surface 24a may include various surface defects, such as a pit 122, a bump 124, or a surface portion 126 void of magnetic material.

As is shown in FIG. 5, the thermal response voltage level 119 of the MR element 72 changes as a function of the spacing, denoted by parameter y, between the MR element 72 and the disk surface 24a. Changes in the magnetic read back signal result from changes in the resistance of the MR element 72. More particularly, a typical MR element, which is a resistor that is sensitive to the presence of magnetic fields, is electrically coupled to a current source between positive and negative element leads. A bias current is applied to the MR element 72 via the leads. In normal operation, magnetic fields created by magnetic transitions on the disk surface 24a affect the resistance of the MR element 72 giving rise to voltage variations across the MR element 72. These voltages occur at the frequency of the magnetic data transitions recorded on the disk surface 24a and are the basis for the magnetic signal component of the read back signal.

The resistance of the MR element 72 is also effected by the head-to-disk spacing. More particularly, head-to-disk spacing changes result in concomitant changes in heat transfer from the MR element 72, which is heated by a relatively constant bias current, to the disk 24. The heat transfer is an inverse function of the head-to-disk spacing. If the heat transfer from the MR element 72 is increased (small spacing), then the temperature of the MR element 72 and its resistance will decrease. The temperature and the resistance of the MR element 72 will increase (larger spacing) if the heat transfer is reduced. Thus, changes in the heat transfer between the MR element 72 and the disk 24 results in an alteration of the temperature of the MR element 72.

Temperature changes in the MR element 72 result in corresponding changes in the electrical resistance of the MR element 72 and, therefore, the voltage across the MR element 72 being supplied by a constant bias current. It is noted that variations in slider flyheight typically occur at a frequency significantly lower than that of the magnetic transitions. Therefore, such temperature changes in the MR element 72 occur at a frequency significantly lower than the magnetic data transitions and are the basis of the thermal component of the read back signal.

As FIG. 5 further illustrates, there is an inverse relationship between the topographical surface variations of the disk 24 and the changes in magnitude of the thermal voltage signal 119. As the instantaneous head-to-disk spacing (y) increases, there results a corresponding increase in air space insulation between the MR element 72 and the disk surface 24a, thereby causing an increase in the temperature in the MR element 72. This temperature increase in the MR element results in a corresponding increase in the MR element 72 resistance due to the positive temperature coefficient of the MR element material typically used to fabricate the MR element 72. Permalloy, for example, is a preferred material used to fabricate the MR element 72 and demonstrates a temperature coefficient of $+3 \times 10^{-3}$/° C. An MR element 72 passing over a bump 124 on the disk surface 24a, by way of example, results in increased heat transfer occurring between the MR element 72 and the disk surface 24a, thereby causing cooling of the MR element 72. Such cooling of the MR element 72 causes a decrease in the MR element resistance which, in turn, results in a corresponding decrease in the voltage $v_{TH}$ across the MR element 72 at a constant bias current.

As a result of the above-described interaction between the MR element 72 and the disk surface 24a, it can be seen by referring to the pit 122 depicted on the disk surface 24a that the thermal voltage signal $v_{TH}$ 119 across the MR element 72 increases in amplitudelas a, function of increasing head-to-disk separation distance (y). It can further be seen by referring to the bump 124 depicted on the disk surface 24a that the thermal voltage signal $v_{TH}$ 119 decreases in amplitude as a function of decreasing head-to-disk separation distance. For purposes of convenience, it may be desirable to invert the thermal voltage signal $v_{TH}$ 119 so that changes in disk surface 24a topography correspond directly, rather than inversely, to changes in the thermal voltage signal $v_{TH}$ 119. Thus, the negative value of the MR transducer voltage, $-v_{TH}$, will provide a qualitative indication of the disk surface 24a topography by indicating "cooling areas" as peaks and "heating areas" as valleys. The discussion herein will be based on the assumption that the transducer voltage is not inverted.

Also shown in FIG. 5 is a magnetic spacing signal 121 ($V_{mag}$) which has been conditioned to correspond to variations in the disk surface 24a. It can be seen that the magnetic spacing signal 121 incorrectly indicates the presence of some surface features, such as magnetic voids 126, as variations in the topography of the disk surface 24a. It can further be seen that the magnetic spacing signal 121 provides an inferior indication of other surface features, such as bumps 124, when compared to disk surface imaging information provided by use of the thermal signal 119.

Another characteristic of an MR element 72 that influences the nature of the read back signal obtained from the disk surface concerns a situation whereby the MR element 72 comes into physical contact with the disk surface or other obstruction. A thermal asperity, for example, occurs when a temporary physical contact occurs between the disk surface and the MR element 72. Such contact causes an initial positive (heating) peak 502 of the thermal voltage response followed in rapid succession by a negative (cooling) peak 504. The positive response is caused by mechanical frictional heating between the MR element 72 and the local asperity on the disk surface 24a. The mechanical friction associated with a thermal asperity can scrape off the magnetic coating in the area of physical contact and is one of a number of sources of magnetic voids. The negative response peak 504 may be used to detect disk surface contact, as will be discussed below.

In order to quantitatively assess disk surface topography variations and head-to-disk spacing changes using the thermal signal component of a read back signal, it is desirable to calibrate the thermal voltage response of the MR element 72. As mentioned previously, a calibrated thermal voltage response of the MR element may then be obtained by using a calibration procedure dependent upon the surface roughness of a portion of the disk.

Figure 6:
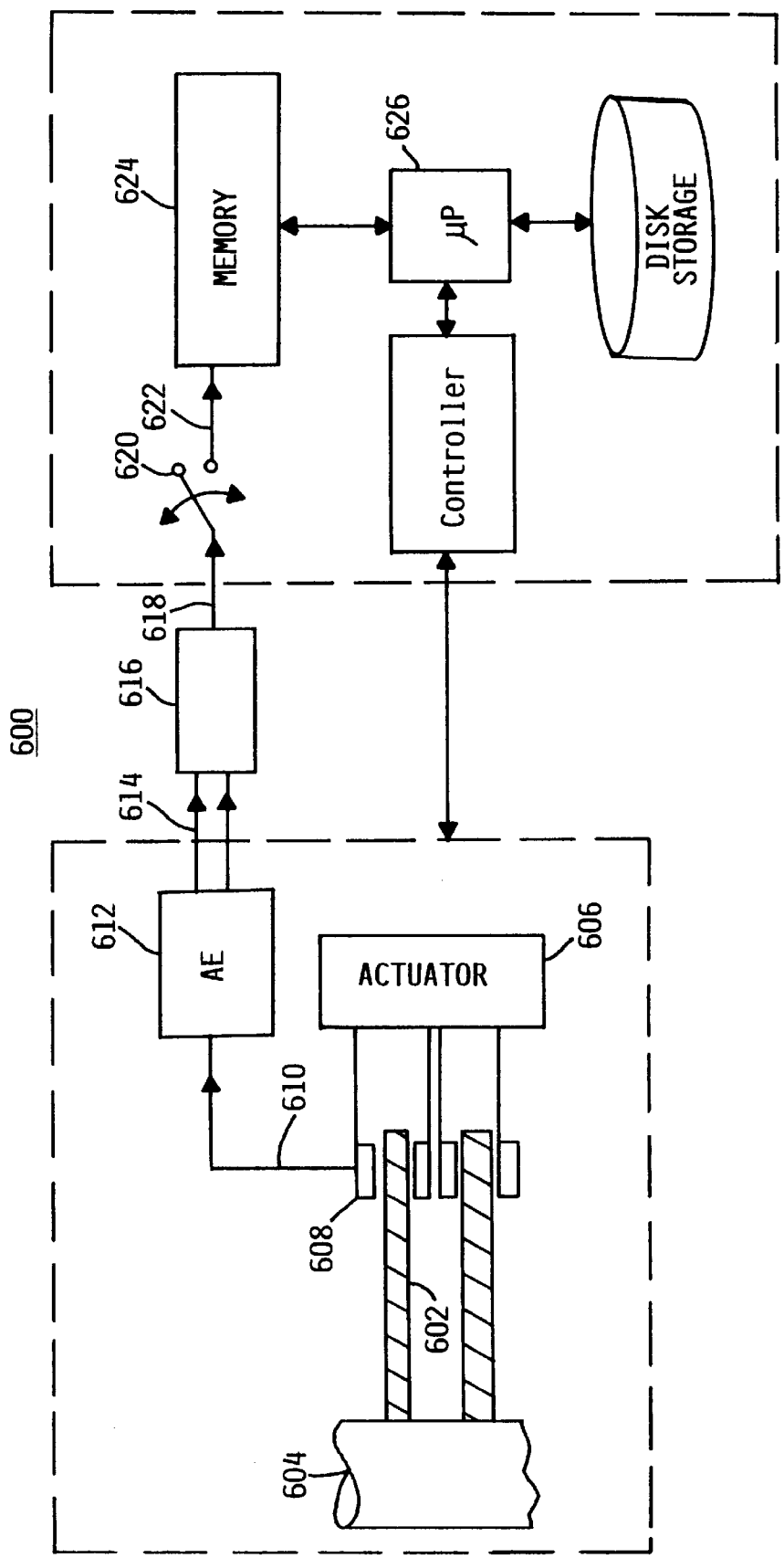
FIG. 6 is an exemplary system for calibrating a thermal response of an MR element in accordance with one embodiment of the invention.

Turning now to FIG. 6, there is shown an exemplary system for calibrating the thermal response of an MR element of an information storage system 600. The system 600 generally includes one or more storage mediums rotatably mounted on a spindle 604. Mounted on an actuator arm assembly 606 and in close proximity to the storage medium (s) are one or more MR elements. For ease of illustration, the system 600 will be hereinafter described with reference to MR element 608 and storage medium 602. It should be appreciated that the description can be generalized to each MR element and storage medium in the system.

As the storage medium 602 rotates, the read back signal 610 induced in the MR element 608 is typically amplified by an arm electronics (AE) module 612, as discussed above. An amplified read back signal 614 is provided to a signal separation/restoration module 616 which produces a thermal spacing signal from the read back signal 610, for example, in the manner discussed above. The thermal spacing signal 618 is then sampled by a sampler 620 and stored in a memory arrangement 624. The sampler 620 may, for example, be an analog-to-digital converter (ADC). The sampling rate of the sampler 620 may be suitably selected in consideration of the design parameters of the information storage system 600. Suitable sampling rates for many applications range from about 2 to 10 megahertz (MHz). The stored thermal spacing signal may be utilized by a processor 626 for a number of purposes, such as, for example, determining changes in the fly height of the MR element 72, disk defect detection and screening, disk surface analysis and topographical mapping, error correction, and predictive failure analysis (PFA). Processing a thermal spacing signal for calibrating the thermal spacing signal and identifying surface defects on a storage medium will be discussed hereinbelow.

Figure 7:
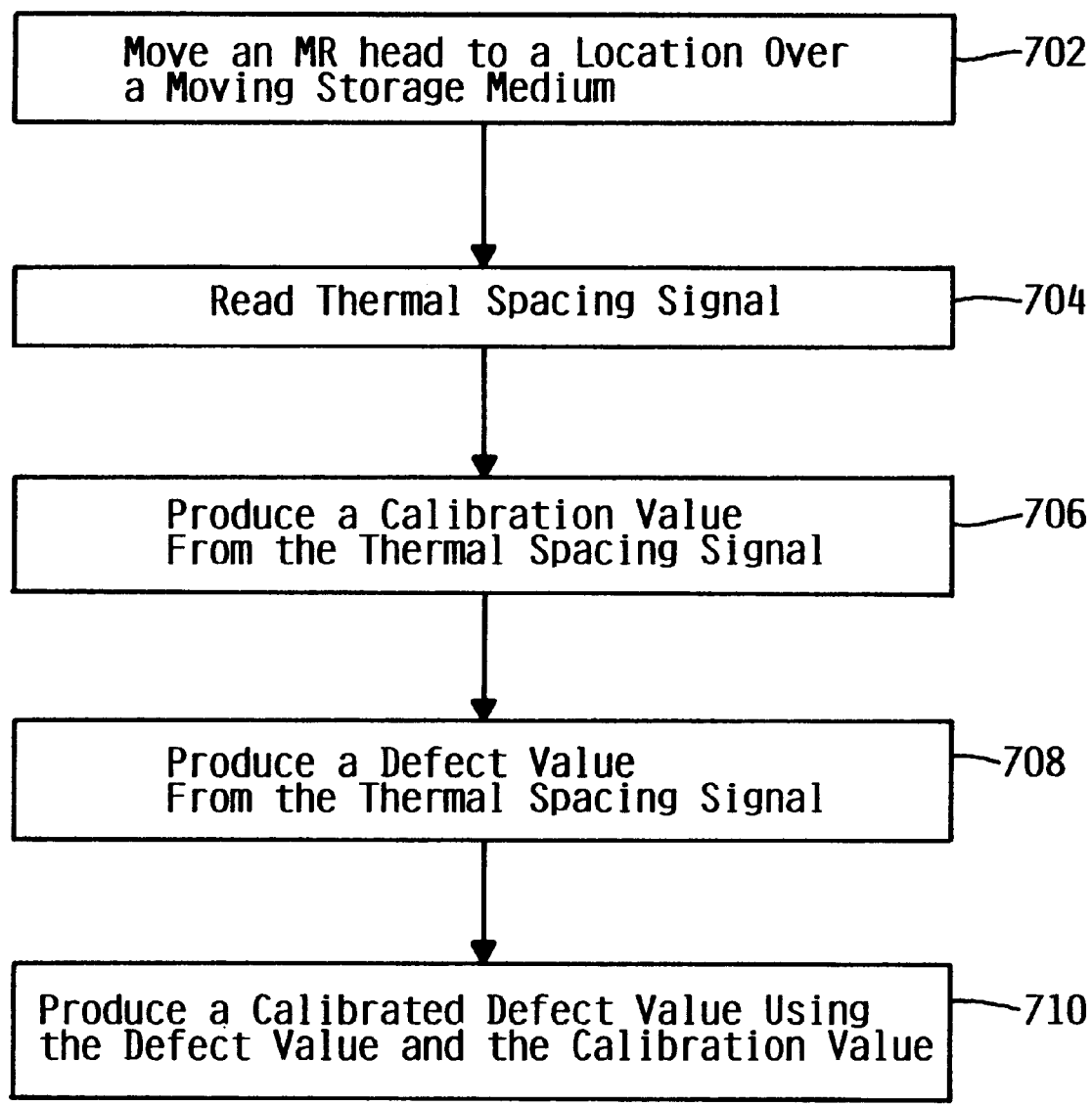
FIG. 7 is an exemplary process for calibrating a thermal response of an MR element in accordance with another embodiment of the invention.

Turning now to FIG. 7, there is illustrated an exemplary process for generating a calibrated thermal signal in accordance with one embodiment of the invention. Block 702 represents moving an MR element to a location over a moving storage medium, such as a tape or a disk. For ease of illustration, a rotating storage medium, such as a disk, will be assumed. The location may, for example, be a desired data track. The thermal spacing signal produced by the MR element is read, as indicated at block 704. This typically involves rotating the rotating storage medium so that the MR element traverses over a portion of the storage medium and a read back signal is induced in the MR element. The thermal spacing signal may, for example, be read by sampling (and in some embodiments, averaging) the thermal signal component of the read back signal and storing the sampled (or sampled averaged) signals in a memory arrangement.

The portion of the storage medium over which the MR element traverses may, for example, include a portion of a track, a full track, or a number of tracks. As will be discussed further below, the rotating storage medium may be rotated through a number of revolutions with the MR element over a single track in order to produce a time-averaged thermal spacing signal. Time averaging the thermal spacing signal advantageously filters out the nonrepeatable components in the readback signal such as electronic noise. After filtering, only the repeatable portions of the signal (such as those resulting from surface defects on the storage medium) will remain.

Using the thermal spacing signal samples, a calibration value for calibrating the thermal spacing signal is produced, as indicated at block 706. The calibration value may, for example, be derived from the thermal spacing signal and dependent upon the surface roughness of the portion of the data disk over which the MR element traversed, as will be discussed further below.

As indicated at blocks 708 and 710, a signal value from the thermal spacing signal may be produced and calibrated using the calibration value. The thermal signal value may, for example, be a peak value of the thermal spacing signal representing of the largest bump on the surface of the portion of the storage medium traversed by the MR element. The calibration of the thermal signal spacing value may, for example, be done by ratioing the thermal signal value to the calibration value.

A significant advantage that is realized when utilizing a calibrated thermal voltage response of the MR element 72 for determining head-to-disk spacing measuremets-concerns the capability to accurately evaluate the topography of a non-magnetized disk surface. Another advantage realized by detecting head-to-disk spacing variations using a calibrated thermal spacing signal, rather than a magnetic spacing signal, concerns a significant increase in imaging resolution when detecting disk surface features and defects that is realized by using the thermal spacing signal. As discussed previously with respect to FIG. 5, a magnetic spacing signal, in contrast to a thermal spacing signal, incorrectly indicates the presence of certain surface features such as magnetic voids, as variations in the topography of the disk surface 24*a*. Further, defects, such as bumps or other protruding surface features, are detected with significantly greater resolution when the thermal spacing signal is used instead of a magnetic spacing signal.

Figure 8:
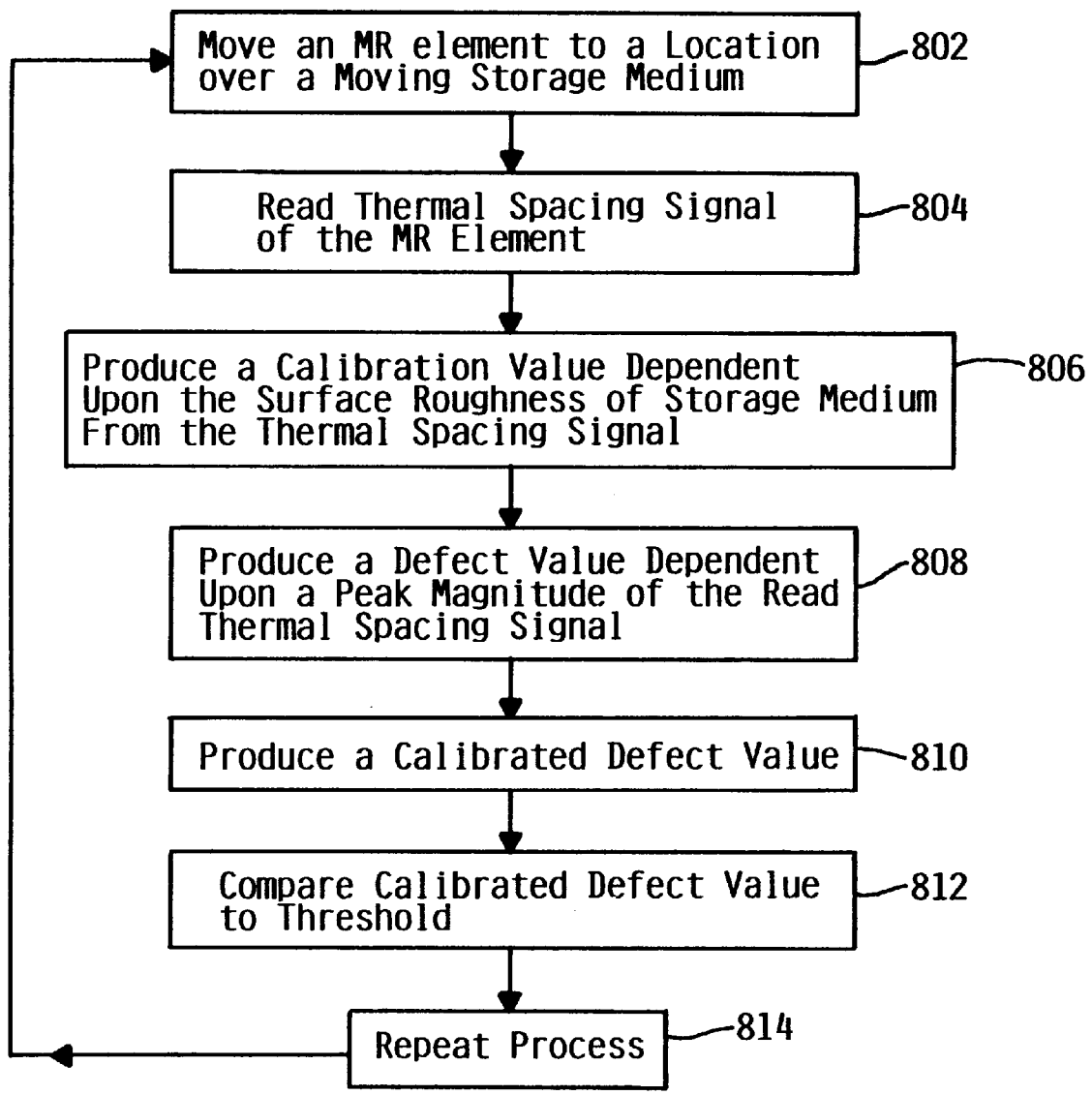
FIG. 8 is an exemplary process for calibrating a thermal response of an MR element in accordance with another embodiment of the invention.

Turning now to FIG. 8, there is illustrated an exemplary process for detecting surface defects of a moving storage medium in accordance with one embodiment of the present invention. While the process of FIG. 8 will be described with reference to a single storage medium and MR element, it should be appreciated that the invention is not so limited. In multiple storage medium storage systems, the processes discussed herein may be applied to each storage medium and,MR element.

First, as indicated at block 802, an MR element is moved to a particular location over a moving storage medium. This may be done, for example, using well-known techniques. For example, the MR element may be moved in-situ using a servo control system or may be moved during the time of manufacturing using an external positioning system. The MR element traverses a portion of the disk, and a thermal spacing signal is read from the MR element, as indicated at block 804. Typically, the thermal spacing signal is read by sampling the thermal output of the MR element and storing the sampled data sequence in a memory arrangement.

The portion of the storage medium traversed by the MR element may, for example, be a portion of a track, a full track, or two or more tracks. In one embodiment, the portion of the moving storage medium traversed by the MR element is one track and the thermal spacing signal is a time-averaged signal. In this embodiment, the MR element is positioned over the selected track as the storage medium moves through multiple revolutions as the thermal output is sampled. The sampled data is then used to generate a timed-averaged spacing signal.

By using a time-averaged spacing signal, defect detection is significantly improved. It has been determined by the inventors that the thermal spacing signal from an MR element contains both repeatable and non-repeatable components. The repeatable component of a thermal spacing signal includes, for example, disk topography, while the non-repeatable component includes factors, such as electronic noise. By time-averaging the thermal spacing signal, components such as electronic noise approach zero and can be separated from the-component of thermal response induced by disk topography. This provides an improved thermal spacing signal. A suitable number of disk revolutions for producing a time-averaged thermal spacing signal ranges from about 10 to 20 revolutions.

Moreover, by generating a thermal spacing signal localized to a particular track, the identification of surface defects is improved. In particular, errors in surface defect detection that, may result from noise dependent upon radial head position can be reduced. For example, the inventors have observed that the thermal background noise of a read back signal can vary between the inner diameter and outer diameter of the disk. This may be due to spindle motor noise, for example.

From the thermal spacing,signal data sequence, a calibration value dependent upon the surface roughness of the data track is produced, as indicated at block 806. The calibration value is typically a value which is representative of the surface roughness of the storage medium about the tested data track. The calibration value may, for example, be the mean, a median, standard deviation, or variance of the thermal spacing signal over the tested track. In one exemplary embodiment discussed further below, the calibration value is the median variance of a set of non-overlapping windows of the thermal spacing signal data sequence.

A defect value dependent upon a peak magnitude of the sampled data sequence is produced, as indicated at block 808. As discussed above, the thermal voltage signal induced in a MR element decreases in amplitude as a function of decreasing head-to-disk separation distance. To identify defects-associated with bumps on the surface of a storage medium, a peak cooling magnitude of the thermal spacing signal (associated with the largest surface bump traversed) may be selected for determining the defect value. To identify depressions, a peak heating magnitude (associated with a depression) may be used.

The defect value may, for example, be the selected peak magnitude itself or be a value derived from the peak magnitude. For example, as will be further discussed below, the defect value may be calculated based on a set of thermal spacing signal data samples in a window about the identified peak magnitude. The defect value calculated from the peak_ signal magnitude is typically of similar units as the calibration value. For example, where a variance of the set of windows is used for the calibration value, a variance of a window about the peak signal magnitude may be used for the defect value.

Using the defect value and the calibration value, a calibrated defect value is produced, as indicated at block 810. The calibrated defect value may, for example, be determined from the relationship:

$$D_c = \frac{D_v}{C_v}$$

where a $D_c$ is the calibrated defect value and $D_v$ and $C_v$ are the defect value and the calibration value in the neighborhood of a defect, respectively. However, it should be appreciated that other relationships may be used and are intended to be covered by the invention.

The calibrated defect value may be compared to a predetermined threshold to detect the presence of a surface defect, as indicated at clock 812. The threshold value is typically a predetermined value selected in consideration of a desired minimum threshold for head-to-disk spacing. It should be appreciated that the threshold value can vary depending on the configuration of the storage system in which it is employed. One suitable predetermined threshold is about 14 decibels, for example.

As indicated at block 814, the process may then be repeated. The process may be repeated, for example, for each track of the storage medium. As noted above, each track may be tested separately to improve the detection of surface defects.

By scaling the defect value associated with disk defects by calibration value depending upon the roughness of a disk surface, parametric variation in the estimation of head-to-disk spacing can be reduced and the estimation of head-to-disk spacing and the identification of surface defects can be improved. Moreover, using the above process, calibration and thermal glide testing may be performed in-situ as well. The above-process uses a defect value and a calibration value both derived from a thermal spacing signal. This eliminates the need to use a magnetic spacing signal for thermal glide testing. The above process may further be used with or without magnetic data on a storage medium or without the need to write or rewrite information on a storage medium.

Using the above process, a greater portion of the surface of a storage medium may be tested for defects as compared to conventional techniques. In particular, the thermal spacing signal used in the above process is available over the entire disk surface. Accordingly, the entire surface of a storage medium may be tested if desired. Conventional techniques using magnetic signals typically cannot test for defects over portions of the disk which include servo information, as the servo information includes frequencies which make it difficult to estimate head-to-disk spacing. Accordingly, using these conventional techniques, substantial portions (e.g., 10%–15%) of a storage medium surface cannot be tested.

Details of an exemplary software function which may be used to detect surface defects will be illustrated with reference to Table 1 below. Generally, the software function receives a thermal spacing signal, determines a variance of the thermal spacing signal ("roughness variance") and a variance of a particular portion of the thermal spacing signal ("signal variance") and returns a signal-to-roughness (SRR) ratio of the two variances. The SRR ratio may be used for surface defect detection. For example, the roughness variance may represent the surface roughness of the portion of the storage medium from which the thermal spacing signal was induced and may be tested as a calibration value, while the signal variance may be associated with a peak magnitude and used as a defect value.

The name of the software function as well as its input parameters, npx, W_signal, and W_noise are identified at line 2. Parameter npx generally represents the sampled data of a thermal spacing signal, which may, for example, be a time-averaged thermal spacing signal. Parameters W_signal and W_noise represent window lengths for calculating a signal variance and a roughness variance, respectively, as will be discussed below. Processing the thermal spacing signal npx may include normalizing the signal, as indicated at line 7.

The exemplary software function is typically used in the detection of disk contact events. As these events are typically associated with negative thermal signals, positive values of the thermal spacing signal npx may be set to zero, as indicated at line 13. The latter ensures that thermal signals arising from pits or depressions do not contribute to the variance calculations. In other surface processing routines, both the positive and negative values of the thermal spacing signal may be used, as indicated at lines 10–11, or only the positive values may be used as indicated at lines 8–9.

TABLE 1

| | |
|---|---|
| 1. | %Computes ratio of the signal variance to the noise variance in db |
| 2. | function r = tgtsnr(npx,W_signal,W_noise) |
| 3. | %Define constants |
| 4. | %W_signal = 4; width of the window used to compute signal variance |
| 5. | %W_noise = 24; width of the window used to compute noise variance |
| 6. | % Normalize data by subtracting mean |
| 7. | npx = npx − mean(npx); |
| 8. | %Use only the positive part of the signal if desired |
| 9. | %npx = nx(nx>0); |
| 10. | %Use both the positive and negative parts of the signal if desired |
| 11. | %npx = nx; |
| 12. | %Use only the negative part of the signal if desired |

TABLE 1-continued

```
13.     npx = (npx<0).*npx;
14. %Compute the noise power by using the median variance for all the W_noise-sized
15. % sample blocks of npx
16.     noise_vec_std = [ ];
17.     for ii=1:W_noise:length(npx)-W_noise
18.         Noise_vec_std = [noise_vec_std
19.         std(npx(ii+W_noise-1)))}];
20.     end
21.     med_noise_std = median(noise_vec_std);
22.     med_noise_var = med_noise_std^2;
23. %compute the signal power by finding the peak value in the npx sequence and then
24. %find the variance based on W_signal samples encompassing the signal peak
25.     [YY,II] = min(npx);
26. % Some checking is required to make sure that the windows don't
27. % extend beyond the data vector size. If so, use the vector extremes as the
28. % limits.
29.     if (II-W_signal/2)<1
30.         starting_window_index = 1;
31.     else
32.         starting_window_index = II-W_signal/2;
33.     end
34.     if (II+W_signal/2) > length(npx)
35.         ending_window_index = length(npx)
36.     else
37.         ending_window_index = II+W_signal/2;
38.     end
39. Signal_std = std(npx(starting_window_index:ending_window_index));
40. signal_var = signal_std^2;
41. r = 20*log10(signal_var/med_noise_var);
```

Routines for calculating a roughness variance and a signal variance will now be discussed. These routines are provided by way of example and not of limitation. Those skilled in the art will recognize that the variances may be determined in a number of different manners. These manners are intended to be covered wherein.

Lines 14–22 illustrate an exemplary routine for calculating a roughness variance. In accordance with the routine, the data npx is windowed into a set of consecutive, non-overlapping windows of length W_noise and the standard variation of each window is calculated as indicated at lines 16–20. The median of the standard deviations of the windows is determined at line 21 and squared to generate a roughness variance at line 22.

Lines 23–40 represent an exemplary routine for calculating a signal variance. Generally, the routine identifies a peak magnitude of the data sequence and computes the variance of a window of samples which encompass the identified peak magnitude. As noted above, the exemplary function identifies a peak cooling magnitude as the peak magnitude since positive thermal spacing signals were set to zero. The window about the peak magnitude is generally of length W_signal. However, should the length of the W_signal extend beyond the length of the data sequence npx, the window size may be shortened such that the end of the window coincides with an end or beginning of the data sequence npx, as indicated at lines 29–38. The variance of the window surrounding the peak value is determined at line 39 and squared at line 40 to develop a signal variance. A SRR ratio of the signal variance to roughness variance is returned, as indicated at line 41.

The lengths of the signal window W_signal and roughness windows W_rough may be suitably selected in consideration of the storage device and processing used. Roughness window lengths W_rough of about 5 to 10 times the length of the signal window W_signal are suitable for many applications. For example, in a storage system having a storage medium rotating at 7200 revolutions per minute, a thermal spacing signal may be generated by sampling the thermal output of a read element at about a $2E10^6$ samples per second with the length of the signal window W_signal being, for example, 12 samples or 6 microseconds and the length of the roughness W_rough being, for example, 72 samples or 36 microseconds.

Figure 9:
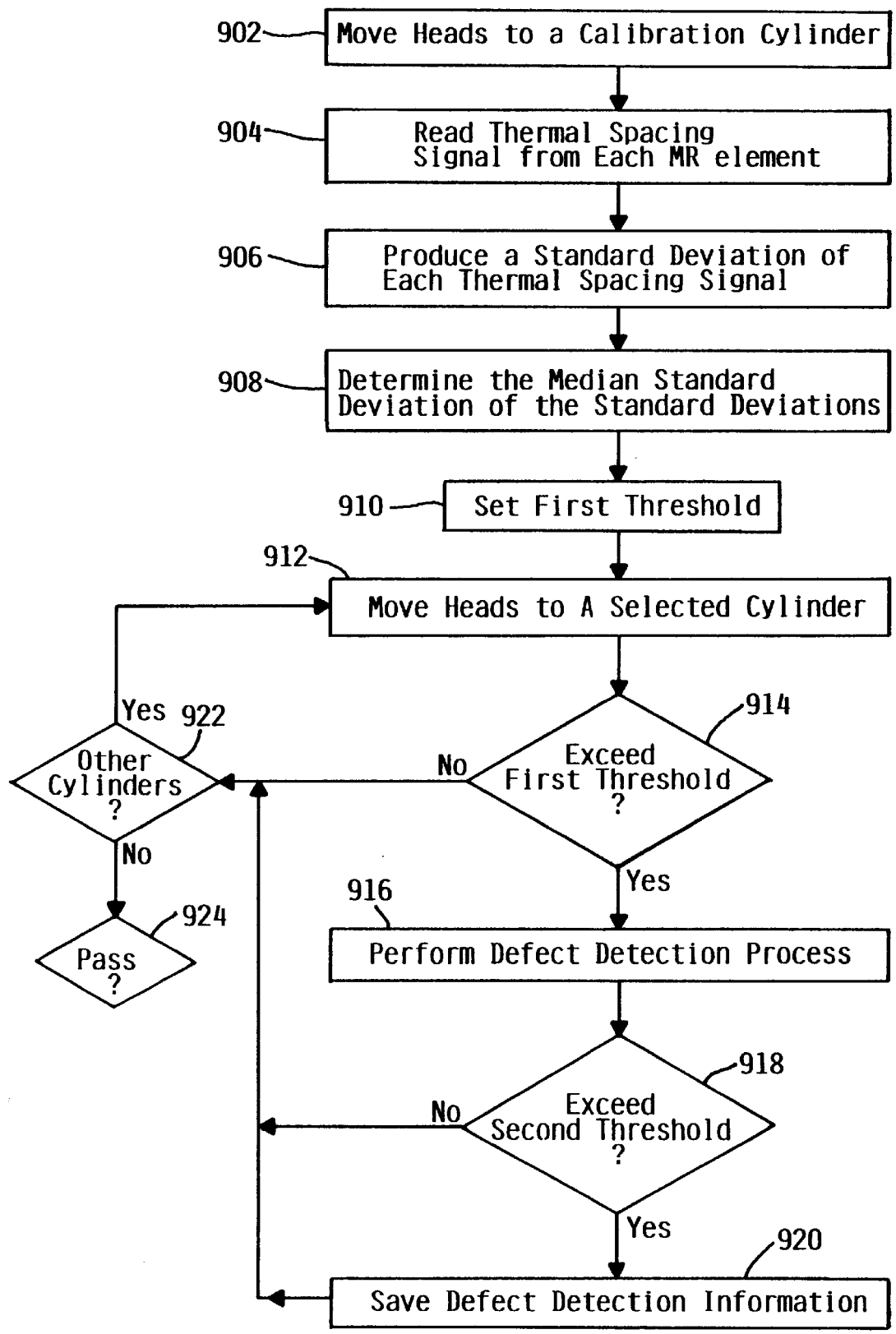
FIG. 9 is an exemplary process for detecting disk contact events in accordance with another embodiment of the invention.

Turning now to FIG. 9, there is illustrated an exemplary process for detecting head-to-disk interference (hdi) surface defects in an information storage system having multiple storage mediums and MR elements. Block 902 represents moving the MR elements to a predetermined calibration cylinder. The calibration cylinder may, for example, be a middle diameter cylinder. By using a middle diameter cylinder as the calibration cylinder, thermal sensitivity variation is typically minimized as compared to inner diameter and outer diameter test cylinders of the storage device. While in the calibration cylinder, a thermal spacing signal is read for each MR element as its associated storage medium rotates thereunder, as indicated at block 904. This typically involves rotating the storage medium through a number of revolutions, for example, 10, and sampling the thermal output of the MR elements.

A standard deviation for the thermal spacing signal associated with each MR element is determined, as indicated at block 906. The standard deviation may be the standard deviation of the entire data sequence for each MR element or, the data sequences may be subdivided into windows and a median standard deviation of the windows may be used as the standard deviation. From the standard deviations calculated at block 906, a median standard deviation is determined as indicated at block 908.

The median standard deviation is then used to set a threshold for identifying potential defect sites, as indicated at block 910. This typically involves setting the threshold or clip level of an analog comparator of the storage system to a multiple of the median standard deviation. The multiple is suitably selected in consideration of the desired reject rate of the defect detection process. A multiple of four would be suitable for many applications.

Blocks 912–922 generally represent the testing of each cylinder in the storage device for defects. Block 912 represents moving the MR elements to a cylinder and reading the induced thermal signals in the MR elements. Decision block 914 represents determining whether any of the induced thermal signals exceed the threshold of the analog comparator. If the threshold is not exceeded, control moves to block 922 where it is determined whether other cylinders remain for testing. If further testing is indicated, the MR elements are moved to another cylinder for defect detection, as indicated by blocks 922 and 912. If the threshold of the analog comparator is exceeded, the track including the potential defect site and the associated MR element are identified and control moves to block 916 where more elaborate defect detection processing is performed. It should be noted that the steps of blocks 912 and decision block 914 may be repeated prior to moving to block 916 to verify the identification of a potential defect site.

Block 916 represents further processing used to determine whether the identified potential defect site is a disk contact event. Generally, this includes performing the steps indicated in blocks 804–812 of FIG. 8 in order to determine whether the identified defect site represents a head-disk interference (hdi) event. This may include, for example, reading an induced thermal spacing signal from the MR element associated with the rotating storage medium data track having the defect site, as discussed above with respect to block 804; producing a calibration value dependent upon the surface roughness of the identified track and producing a defect value dependent upon a peak magnitude of the sampled thermal signal data sequence, as discussed above with respect to block 808; and generating a calibrated defect value using the defect value and calibration value, as indicated at block 810. The calibrated defect value is then compared to a predetermined threshold, as indicated at decision block 918. The predetermined threshold may be suitably selected in order to discriminate between hdi events and non-hdi events. A suitable threshold may, for example, be about 14 decibels.

If the calibrated defect value exceeds the predetermined threshold, the system stores information related to the head-to-disk interference event as indicated at block 920. This may, for example, include saving information identifying the problematic MR element and track/cylinder as well as the sampled thermal spacing signal and calculated variances and ratios.

After saving the information at block 920 or if the threshold is not exceeded at decision block 918, control moves to block 922 where it is determined whether there remain cylinders to be tested. If some cylinders remain untested, control moves to block 912; otherwise, control moves to decision block 924 where it is determined whether the defection detection check has passed.

It will, of course, be understood that various modifications and additions can be made to the embodiments discussed hereinabove without departing from the scope or spirit of the present invention. Accordingly, the scope of the present invention should not be limited to the particular embodiments discussed above, but should be defined only by the full and fair scope of the claims set forth below.

What is claimed is:

1. A method of calibrating a thermal response of a magnetoresistive (MR) element spaced apart from a surface of a moving storage medium, comprising:
   reading a thermal spacing signal using the MR element;
   producing a signal value from the thermal spacing signal;
   producing a calibration value from the thermal spacing signal; and
   producing a calibrated signal value using the signal value and calibration value.

2. The method of claim 1, wherein reading the thermal spacing signal includes traversing the MR element over a portion of the storage medium.

3. The method of claim 2, wherein the portion of the storage medium traversed by the MR element is a track.

4. The method of claim 3, wherein the MR element traverses the track two or more times and the thermal spacing signal is a time-averaged signal.

5. The method of claim 4, wherein the MR element traverses the track 5 to 10 times.

6. The method of claim 2, wherein the calibration value represents the surface roughness of the portion of the storage medium.

7. The method of claim 2, wherein the signal value represents the largest surface bump on the portion of the storage medium.

8. The method of claim 1, wherein reading the thermal spacing signal includes sampling a thermal output of the MR element, the thermal spacing signal including a number of data samples.

9. The method of claim 8, wherein producing the signal value includes:
   identifying a peak magnitude of the thermal spacing signal; and
   calculating a variance of a first window of the thermal spacing signal, the first window including a set of the data samples including the peak magnitude, the calculated variance being the signal value.

10. The method of claim 9, wherein producing the calibration value includes:
    determining a window variance for each of a plurality of second windows of the thermal spacing signal; and
    determining the median variance of the plurality of window variances, the median variance being the calibration value.

11. The method of claim 10, wherein the second windows each have a length about 6 times the length of the first window.

12. The method of claim 8, wherein producing the calibration value includes:
    determining a window variance for each of a plurality of windows of the thermal spacing signal; and
    determining the median variance of the plurality of window variances, the median variance being the calibration value.

13. The method of claim 12, wherein the plurality of windows are non-overlapping and contain the entire sampled thermal spacing signal.

14. The method of claim 1, wherein the calibrated signal value is a ratio of the defect value to the calibration value.

15. The method of claim 1, wherein the storage medium is a data storage disk.

16. A method of detecting surface defects on a moving storage medium using a thermal response of a magnetoresistive (MR) element spaced apart from a surface of the moving storage medium, comprising:
    reading a thermal spacing signal using the MR element;
    producing a defect value from the thermal spacing signal;
    producing a calibration value from the thermal spacing signal;
    producing a calibrated defect value using the defect value and calibration value; and
    comparing the calibrated defect value to a threshold to detect to a surface defect.

17. The method of claim 16, wherein reading the thermal spacing signal includes traversing the MR element over a track of the storage medium.

18. The method of claim 17, wherein the MR element traverses the track two or more times and the thermal spacing signal is a time-averaged signal.

19. The method of claim 18, wherein the MR element traverses the track 5 to 10 times.

20. The method of claim 17, wherein the calibration value is indicative of the surface roughness of the track of the storage medium.

21. The method of claim 17, wherein the defect value is indicative of the largest surface bump on the track of the storage medium.

22. The method of claim 16, wherein reading the thermal spacing signal includes sampling a thermal output of the MR element, the thermal spacing signal including a number of data samples.

23. The method of claim 22, wherein producing the signal value includes:

identifying a peak magnitude of the thermal spacing signal; and calculating a variance of a first window of the thermal spacing signal, the first window including a set of the data samples including the peak magnitude, the calculated variance being the signal value.

24. The method of claim 22, wherein producing the calibration value includes:

determining a window variance for each of a plurality of windows of the thermal spacing signal; and determining the median variance of the plurality of window variances, the median variance being the calibration value.

25. The method of claim 16, wherein the calibrated defect value is a ratio of the defect value to the calibration value.

26. The method of claim 16, wherein the storage medium includes a plurality of tracks and the thermal spacing signal is developed by traversing the MR element around one of the tracks.

27. The method of claim 26, wherein the method of claim 2 is repeated for each of the plurality of tracks.

28. An information storage device, comprising:

a transducer including a magnetoresistive (MR) element;

a storage medium having a surface;

an actuator for moving at least one of the transducer and the storage medium to provide a relative movement between the transducer and the storage medium, the transducer being arranged relative to the storage medium such that a spacing separates the MR element from the surface of the storage medium;

a read channel, coupled to the transducer, for reading a thermal spacing signal induced by the storage medium; and a processor, coupled to the read channel, for producing a defect value and a calibration value from the thermal spacing signal and producing a calibrated defect value using the defect value and the calibration value.

29. The information storage device of claim 28, wherein reading the thermal spacing signal includes traversing the MR element over a track of the storage medium.

30. The information storage device of claim 29, wherein the MR element traverses the track two or more times and the thermal spacing signal is a time-averaged signal.

31. The information storage device of claim 29, wherein the calibration value is indicative of the surface roughness of the track of the storage medium over which the MR element traverses.

32. The information storage device of claim 28, wherein the defect value is indicative of the largest surface bump of the track of the storage medium over which the MR element traverses.

* * * * *

UNITED STATES PATENT AND TRADEMARK OFFICE
CERTIFICATE OF CORRECTION

PATENT NO. : 6,239,936 B1
DATED : May 29, 2001
INVENTOR(S) : David William Abraham; Timothy Joseph Chainer; Karl-Friedrich Etzold; Hal Hjalmar Ottesen; Gordon James Smith Page 1 of 1

It is certified that error appears in the above-identified patent and that said Letters Patent is hereby corrected as shown below:

Column 17,
Line 16, replace "signal" with -- defect --
Line 23, replace "signal" with -- defect --

Signed and Sealed this

Fifth Day of March, 2002

Attest:

JAMES E. ROGAN
*Attesting Officer*     *Director of the United States Patent and Trademark Office*